Figures 1, 2, 3, 4:
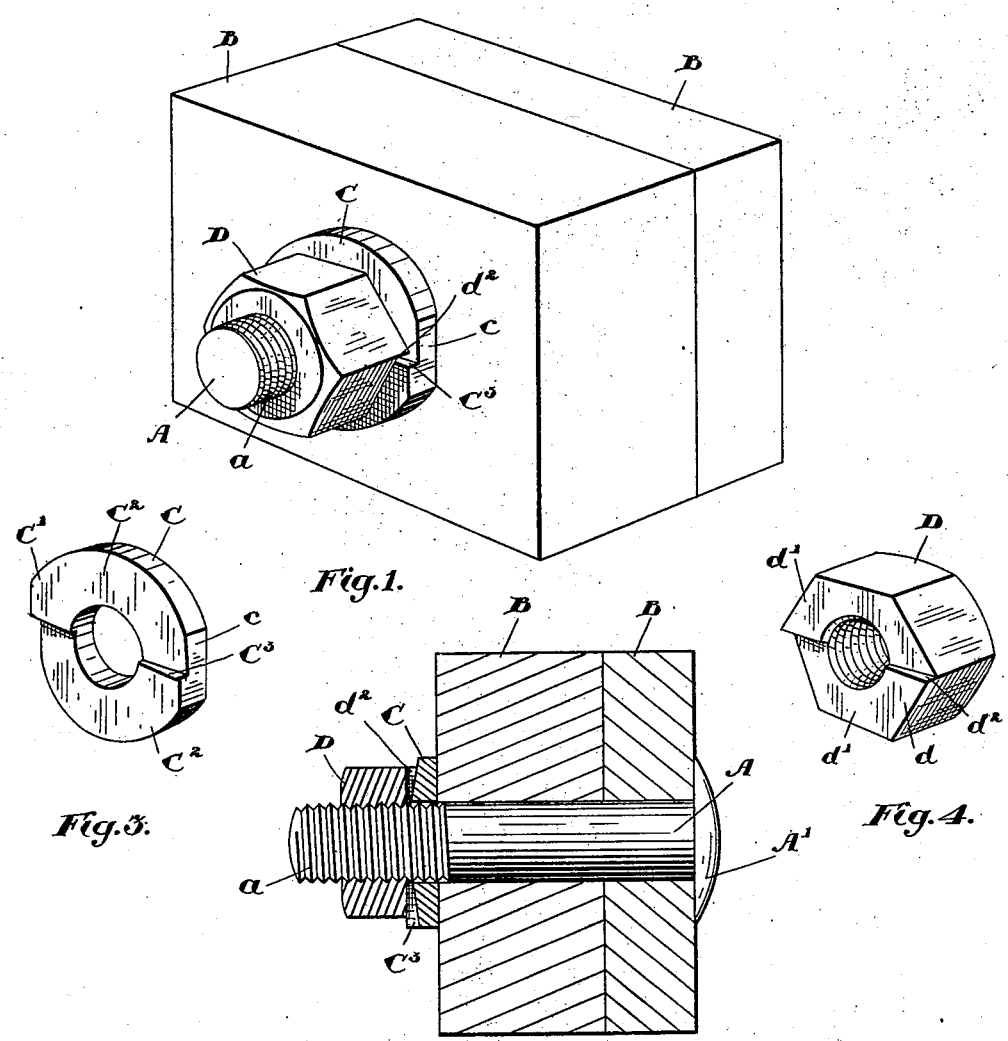

No. 723,419. PATENTED MAR. 24, 1903.
W. STINSON.
NUT LOCK.
APPLICATION FILED JUNE 27, 1900.
NO MODEL.

Witnesses.
H. Dennison.

Inventor.
W. Stinson.
by Fetherstonhaugh & Co
Att'ys.

UNITED STATES PATENT OFFICE.

WILLIAM STINSON, OF TORONTO, CANADA, ASSIGNOR OF ONE-HALF TO JAMES LESLIE LOVE AND DUNCAN D'ESTERRE COOPER, OF TORONTO, CANADA.

NUT-LOCK.

SPECIFICATION forming part of Letters Patent No. 723,419, dated March 24, 1903.

Application filed June 27, 1900. Serial No. 21,803. (No model.)

*To all whom it may concern:*

Be it known that I, WILLIAM STINSON, agent, of the city of Toronto, in the county of York, in the Province of Ontario, Canada, have invented certain new and useful Improvements in Nut-Locks, of which the following is a specification.

My invention relates to improvements in nut-locks; and the object of the invention is to devise an extremely simple device whereby a nut when once screwed up upon the threaded end of the bolt cannot become unfastened and recede from its tightened position unless by acting upon the washer by a wrench or suitable loosening device; and it consists, essentially, of a washer provided, preferably, with a plurality of sides and a substantially ratchet-shaped outer face and a nut provided with a substantially ratchet-toothed inner face designed to coact with the incline of the teeth formed on the washer in the manner hereinafter more particularly explained.

Figure 1 is a perspective view showing a washer and nut on the end of the bolt, which is fastening two blocks or plates together. Fig. 2 is a cross-section. Fig. 3 is a detail of the washer. Fig. 4 is a detail of the nut.

In the drawings like letters of reference indicate corresponding parts in each figure.

A is the bolt, which is provided with the usual head A'.

B B are the plates or parts to be fastened together.

$a$ is the threaded end of the bolt.

C is a washer which is preferably provided with a plurality of sides $c$, which are designed to form a means to turn the washer. There may be two flat sides $c$ or there may be any desired number—that is, the washer may be made in square form or hexagonal or octagonal, as may be desired.

C' represents the ratchet-shaped teeth formed on the outside face of the washer. It will be noticed that I preferably show two teeth C' and that each tooth C' has a long inclined face $C^2$ and a short locking side $C^3$, which is preferably at right angles to the plane of the inside face of the washer and on a radial line with the center of the washer. Of course the center opening of the washer has a plain periphery.

D is the nut, which has preferably two long ratchet-shaped teeth $d$ with a long inclined face $d'$ and a side $d^2$ substantially at right angles thereto and on a radial line with the center of the nut. In fact, the sides $d'$ and $d^2$ correspond in every respect, both as to incline and relative position and depth of the tooth, to the sides $C^2$ and $C^3$ of the ratchet-teeth of the washer C, except that they are arranged on opposite inclines or slants.

The washer C is first put on in the usual manner, and the nut D is then screwed onto the end of the bolt and gradually screwed home until the sides $d^2$ come in contact with the sides $C^3$. In placing the washer first in position I may state that the washer is left slightly loose, so that when the nut is being screwed home the side $d^2$ when it first catches the side $C^3$ will turn the washer around until the thread brings such side of the nut $d^2$ inwardly to the full depth of the side $C^3$, when the washer and nut will be locked in position. The only means now by which the nut may be removed is to apply a wrench to the sides of the washer, which, as the ratchet-teeth on both the washer and nut are oppositely set and engage with each other, will serve to turn the nut until it moves outwardly and the ends of the sides $d^2$ are free from the engaging sides $C^3$, when the nut may be readily removed and the washer also, if desired. Upon the nut being screwed home, as hereinbefore described, it will be impossible for the nut to become loosened, and, indeed, the nut cannot be turned by itself, as necessarily the inclined faces $d'$ of the ratchet-teeth of the nut could not "ascend," so to speak, the inclined faces $c^2$ of the washer.

Such a simple device as I describe can be used on railway-tracks, freight and passenger cars, bridges, vehicles, and machinery of all kinds, cabinet-drawers, handles, and, in fact, any place where nuts and bolts are used and there is danger of such nuts becoming loosened.

Both nut and washer may be made at a minimum cost and practically at no extra expense to the ordinary nut and washer now in use.

What I claim as my invention is—

The combination with a threaded bolt cylindrical throughout its length, of a washer free to turn thereon having one of its faces provided with two inclined oppositely-extending flat planes or surfaces, said planes lying on each side of a diametrical line extending through the washer which is defined by shoulders formed by said planes, and a nut having an abutting face with similar planes but reversely inclined to the planes of the washer, the shoulders on the nut and washer abutting when the nut is screwed up, whereby said parts will move in unison in the tightening movement of the nut.

WILLIAM STINSON.

Witnesses:
  B. BOYD,
  L. BLACKMORE.